United States Patent [19]

Kitaj

[11] 3,959,533

[45] May 25, 1976

[54] METHOD OF IMPROVING ADHESION OF RUBBERY COPOLYMERS TO GLASS
[75] Inventor: Walter Kitaj, Toledo, Ohio
[73] Assignee: Owens-Illinois, Inc., Toledo, Ohio
[22] Filed: Mar. 25, 1975
[21] Appl. No.: 561,926

[52] U.S. Cl. .................. 427/386; 260/29.6 MN; 260/33.2 EP; 260/836; 427/379; 427/387; 427/407; 428/415; 428/429; 428/447
[51] Int. Cl.$^2$................. B05D 17/10; B05D 25/04
[58] Field of Search ........... 427/407, 412, 387, 386; 428/429, 447, 391, 392; 260/29.6 MN, 33.2 EP, 836, 837 R

[56] References Cited
UNITED STATES PATENTS

| | | | |
|---|---|---|---|
| 3,525,703 | 8/1970 | Iwami | 260/836 X |
| 3,650,997 | 3/1972 | Weisfeld et al. | 260/33.2 EP X |
| 3,658,571 | 4/1972 | Marzocchi | 428/392 X |
| 3,682,687 | 8/1972 | Obuchi et al. | 427/412 X |
| 3,765,927 | 10/1973 | Marzocchi | 427/412 |
| 3,813,351 | 5/1974 | Thomson | 260/29.6 MN X |

Primary Examiner—Ralph Husack
Attorney, Agent, or Firm—Robert F. Rywalski; Edward J. Holler

[57] ABSTRACT

The adhesion of rubbery copolymers such as styrene-butadiene and styrene-isoprene rubbers to glass is vastly improved by first applying to the glass surface a combination of two primers within specified ratios and separately applying the copolymer thereover. In addition, the alkali resistance of the resulting bond is excellent when exposed to the normal washing cycle for glassware so coated. The method comprises first applying a combination of from 90 to 95% by weight of a first primer consisting of a 50% by weight latex containing 55 mol percent styrene and 45 mol percent butadiene plus 2% by weight of N-aminoethyl-gamma-aminopropyltrimethoxysilane and from 10 to 5% by weight of a second primer consisting of 8.4 parts by weight of an epichlorohydrin-bisphenol A resin, 1.6 parts by weight of N-Aminoethyl-gamma-aminopropyltrimethoxysilane and 45 parts by weight each of ethyleneglycolmonomethylether and ethyleneglycolmonoethyl ether acetate.

6 Claims, No Drawings

METHOD OF IMPROVING ADHESION OF RUBBERY COPOLYMERS TO GLASS

BACKGROUND OF THE INVENTION

Various compounds have been used in the past as primers or coupling agents for adhering all types of polymers to glass. One such compound is N-[beta-(N'-paravinylbenzyl)-aminoethyl]-gamma-aminopropyl-trimethoxysilane hydrochloride claimed in U.S. Pat. No. 3,734,763 and described in Applied Polymer Symposium, 19, 75 (1972) as a virtually universal coupling agent and adhesion promoter for almost all plastics to almost all rigid surfaces. However, such a coupling agent when used alone especially to adhere vinyl polymers to glass does not provide a bond which will resist alkali satisfactorily.

In U.S. Pat. No. 3,674,542, glass fibers are coated with a liquid composition consisting of 1 to 10 weight percent of a vinylic aromatic and a diolefin (such as styrene-butadiene copolymer) and 0.2 to 2 weight percent of a hydrolyzable silane such as gamma-aminopropyltriethoxysilane. The adhesion obtained before alkali immersion of the coating is reported to be excellent and the patentees state that the silane is essential to get adhesion.

More recently, mixtures of resins and silanes have been marketed commercially as coupling agents for various polymers and glass. Typical of such mixtures are XZ8-5066 available from Dow-Corning Corporation, Midland, Michigan which contains 8.4 parts by weight of an epichlorohydrin-bisphenol A resin having an epoxide equivalent of 182 to 189 and 1.6 parts by weight of N-aminoethylgamma-aminopropyltrimethoxysilane (Z-6020) in 45 parts by weight each of ethyleneglycolmonomethylether and ethyleneglycolmonoethylether acetate which is said by the makers to be useful for coupling polyurethanes and other thermosetting resins to glass.

Another mixture available from Dow-Corning is XZ8-5080 which is a 50% by weight latex of 55 mol percent styrene and 45 mol percent butadiene containing 2 percent by weight of Z-6020 which is useful for coupling styrene-butadiene copolymers and other thermoplastic resins such as polyolefins to glass.

Despite the virtues of the coupling agents hereinbefore described, the adhesion obtained between the polymer and glass is not always acceptable when the coated glass is washed in dilute alkali. In other words, adhesion of a particular polymer to glass is still an individual problem since no single coupling agent is satisfactory in all cases. It is therefore the object of this invention to develop a stronger bond between rubbery copolymers and glass which will resist alkali and render a glass container so coated virtually shatterproof if accidentally dropped.

SUMMARY OF THE INVENTION

It has now been discovered that when primers XZ8-5080 and XZ8-5066 previously identified are combined in a critical ratio of 90 to 95% by weight of XZ8-5080 to 10 to 5% by weight of XZ8-5066 and applied to a glass surface and subsequently coated with a styrene-butadiene or styrene-isoprene rubbery copolymer containing from 25 to 75 parts by weight of styrene and from 75 to 25 parts by weight of butadiene or isoprene and the coating is cured for about 30 minutes at about 150°C., a synergistic adhesive effect is obtained between the copolymer and the glass compared to the adhesion obtained when either primer is applied alone before coating said primer with the copolymer. The adhesion is retained even after immersion of the coated glass in dilute alkali solution.

PREFERRED EMBODIMENTS OF THE INVENTION

The rubbery copolymers employed as coatings for glass are manufactured by Shell Chemical Company, Houston, Texas, containing various ratios of styrene with butadiene or isoprene under the Kraton trademark. For example, Kraton 1101 contains 30 parts by weight of styrene to 70 parts by weight of butadiene whereas Kraton 1108 contains 31 parts by weight of styrene and 69 parts by weight of isoprene. Similarly, Phillips Petroleum Corporation, Bartlesville, Oklahoma, produces K-resins containing various ratios of styrene and butadiene or isoprene within the ranges hereinbefore set forth.

In carrying out the present invention, it is critical and essential that the primer combination contain a major proportion of XZ8-5080 in a ratio of 90 to 95% by weight for each 5 to 10% by weight of XZ8-5066 and preferably a ratio of about 90% by weight of XZ8-5080 to 10% by weight of XZ8-5066. The combination of primers in each instance is applied to the glass surface by doctor blade, spraying or dipping to form a film about 5 mils thick which is dried for about 15 minutes at 90°C. before applying the copolymer as a 25% by weight solution in xylene. The final coating about 8 mils thick is cured for 30 minutes at about 150°C. and then tested for alkali resistance by dipping the coated glass in an aqueous solution containing 4% by weight of sodium hydroxide for 30 minutes at 65°C. After rinsing with water, the coating is cut into 1 inch widths and each width is folded 180° before clamping it into an adhesion tester which measures the peel strength in pounds per one inch width by load cell while the coated glass panel clamped on a sliding platform is moved away at a rate of 12 inches per minute.

The following examples are presented to more fully illustrate rather than limit the invention.

EXAMPLE 1

A composition containing 95% by weight of XZ8-5080 primer and 5% by weight of XZ8-5066 primer was applied to a glass panel by doctor blade as a film 5 mils thick. The film was dried for 15 minutes at 90°C. A rubbery copolymer comprising 75 parts by weight of styrene and 25 parts by weight of butadiene was then applied by doctor blade to form a coating about 8 mils thick which was cured for 30 minutes at 150°C. After immersion of the coated panel in an aqueous solution containing 4% by weight of NaOH for 30 minutes at 65°C., the adhesion of the polymer coating to the glass was 8 pounds per 1 inch width of coating. When either primer alone was used before application of the same rubbery copolymer, the adhesion dropped to 2 pounds per 1 inch width of coating.

EXAMPLE 2

The same procedure as that described in Example 1 was used except that the primer composition contained 90% by weight of XZ8-5080 and 10% by weight of XZ8-5066 and the rubbery copolymer contained 25 parts by weight of styrene and 75 parts by weight of butadiene. The adhesion after an alkaline wash was 7 pounds per 1 inch width of the cured coating compared to only 1 pound per inch when either primer was used alone.

Equally good adhesive results are obtained when the same primers are combined in the weight ratios specified in Examples 1 and 2 and applied to glass before coating with a rubbery copolymer containing 75 parts by weight of styrene and 25 parts by weight of isoprene or 25 parts by weight of styrene and 75 parts by weight of isoprene. When either primer is applied alone before coating the glass with the copolymer, the adhesion is practically nil. In other tests, it was found that primer combinations containing XZ8-5080 and XZ8-5066 in a ratio higher or lower than that specified resulted in poor adhesion of the rubbery copolymer to the glass surface after treatment with dilute alkali.

I claim:

1. A method of improving the adhesion of a rubbery copolymer to a glass surface which comprises first applying a combination of from 90 to 95% by weight of a first primer consisting of a 50% by weight latex containing 55 mol percent styrene and 45 mol percent butadiene plus 2% by weight of N-aminoethyl-gamma-aminopropyltrimethoxysilane and from 10 to 5% by weight of a second primer consisting of 8.4 parts by weight of an epichlorohydrin-bisphenol A resin, 1.6 parts by weight of N-aminoethyl-gamma-aminopropyltrimethoxysilane and 45 parts by weight each of ethyleneglycolmonomethylether and ethyleneglycolmonoethylether acetate, subsequently coating the primed glass surface with said copolymer and curing said coating.

2. A method as in claim 1 in which the rubbery copolymer contains from 25 to 75 parts by weight of styrene and from 75 to 25 parts by weight of butadiene or isoprene.

3. A method as in claim 1 in which the combination contains 95% by weight of said first primer and 5% by weight of said second primer.

4. A method as in claim 1 in which the combination contains 90% by weight of said first primer and 10% by weight of said second primer.

5. A method as in claim 1 in which the coating is cured for 30 minutes at 150°C.

6. A method as in claim 1 in which the cured coating is about 8 mils thick.

* * * * *